Aug. 13, 1957  J. G. GIEVERS  2,802,957
ASYNCHRONOUS GYRO MOTOR
Filed Jan. 13, 1954  2 Sheets-Sheet 1

Inventor
Johannes G. Gievers
By Schroeder, Hofgren, Brady & Wegner
Attorneys

Aug. 13, 1957  J. G. GIEVERS  2,802,957
ASYNCHRONOUS GYRO MOTOR
Filed Jan. 13, 1954  2 Sheets-Sheet 2

Inventor
Johannes G. Gievers
By Schroder, Hofgren, Brady & Wegner
attorneys

United States Patent Office 2,802,957
Patented Aug. 13, 1957

2,802,957

ASYNCHRONOUS GYRO MOTOR

Johannes G. Gievers, Lemont, Ill., assignor to Ampatco Laboratories Corporation, a corporation of Delaware Application January 13, 1954, Serial No. 403,820

1 Claim. (Cl. 310—67)

This invention relates to an asynchronous motor and more particularly to an asynchronous motor for use in a gyroscopic instrument.

Commercially available gyro motors are usually of the asynchronous or induction type. They differ somewhat from orthodox induction motors in that the inner element is the stator while the outer element is the rotor. The inner or stator element generally comprises a laminated core with suitable energizing windings inserted therein. The outer or rotor element includes a laminated portion, which completes the magnetic circuit for the device, and is provided with suitable secondary windings such as a squirrel cage assembly. A cylindrical sleeve surrounds the rotor to add weight thereto, the sleeve acting as a flywheel and providing the necessary moment of inertia to render the gyro stable. End plates are secured to the ends of the outer sleeve and carry bearings rotatably supporting the rotor assembly on a shaft extending longitudinally from the stator.

One of the most difficult production problems connected with this sort of gyro motor is that of properly balancing the rotor structure. This must be very accurately done in order to protect the bearings as the motors normally have speeds of the order of 23,000 to 24,000 R. P. M. The composite character of the rotor element, comprising the laminated core, secondary windings and sleeve, makes its very difficult to achieve the desired balance.

I have devised and disclose and claim herein an asynchronous motor, particularly adapted for use as a gyroscope, and in which the rotating element may easily be balanced.

A major feature of the invention is that it provides a gyro motor which comprises stator means for producing a rotating magnetic field and rotor means comprising a homogeneous member of ferromagnetic, conductive material. Another feature is that the rotor means comprises only a sleeve of a homogeneous ferromagnetic, conductive material surrounding the stator. A further feature is that the rotor element is made of steel.

Another feature is that the stator of the motor is provided with a longitudinally extending shaft, and end plates carrying bearing mean are frictionally engaged with the rotor sleeve, rotatably supporting the rotor on the shaft. Still a further feature is that the end plates may be so engaged with the rotor sleeve as to establish a predetermined axial preload on the bearing means.

Further features and advantages will readily be apparent from the following specifications and from the drawings, in which.

Figure 4:
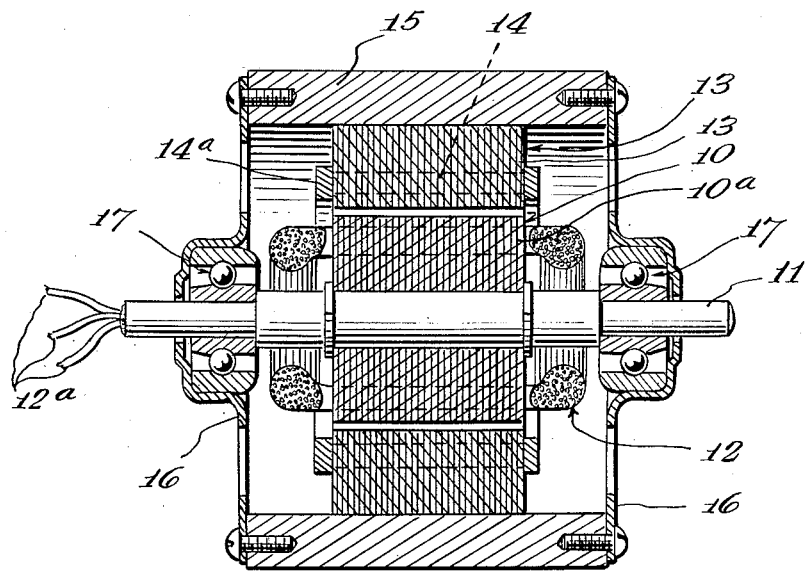
Figure 4 is a longitudinal section analogous to that of Figure 1, but illustrating a prior art device.

Referring now to Figure 4 of the drawings, the prior art device will be described briefly in order to emphasize the advantages of the present invention. The inner stationary element or stator 10 is mounted on longitudinal shaft 11 which, in the case of a gyroscope, may be suitably mounted in gimbals (not shown). The stator 10 is made up of a large number of laminations 10a of a suitable material such as soft iron. Windings 12, which are arranged in slots provided in the stator, may be energized by leads 12a inserted through an opening provided in shaft 11.

Gyroscope motors are normally of the two-pole type and adapted to operate in 400 cycle, 3 phase current. The slip of such motors is relatively small and the actual operating speed is of the order of 23,000 to 24,000 R. P. M.

Because of the high speeds involved, it is imperative that the rotating element, portions 13 and 15 and end plates 16, be very accurately balanced in order to prevent undue bearing wear. Due to the fact that the rotor of Figure 4 includes a plurality of separately formed and subsequently assembled elements, such balancing is a difficult procedure.

Figure 1:
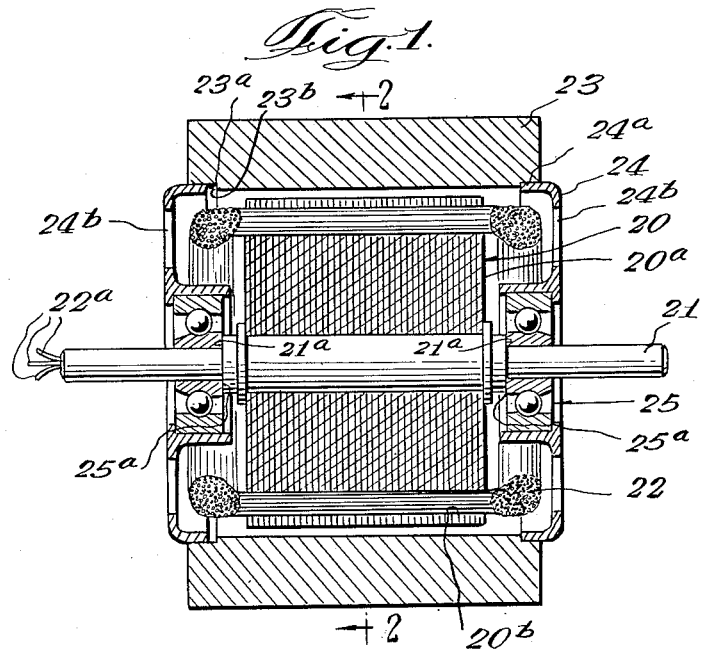
Figure 1 is a sectional view taken along the longitudinal axis of an asynchronous motor embodying the invention.
Figure 2:
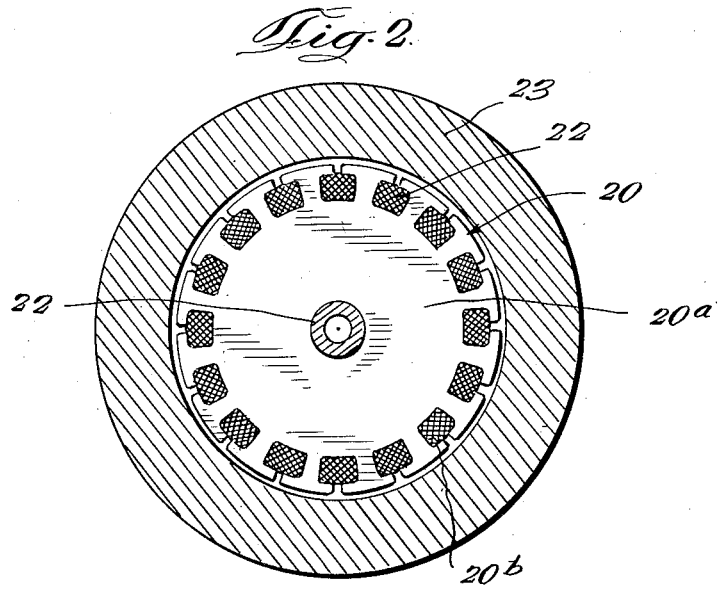
Figure 2 is a transverse section taken along line 2—2 of Figure 1.

Referring now to Figures 1 and 2, which illustrate a preferred embodiment of the invention, it is seen that stator element 20 is made up of a plurality of laminations 20a mounted on longitudinally extending shaft 21. Windings 22 are carried in slots 20b of the stator and are energized by means of leads 22a inserted in shaft 21. These windings are, of course, designed to provide the desired rotating magnetic field.

The rotor element has an active portion which comprises only a cylindrical sleeve 23 of a homogeneous ferro-magnetic, conductive material, such as steel. There are no secondary windings nor laminated core elements.

Sleeve 23 serves a triple function. As it is homogeneous, as contrasted with a laminated core member, a component of the current induced therein flows longitudinally and the sleeve takes the place of the secondary winding. Second, as the sleeve is of a ferromagnetic material, it completes the magnetic circuit, taking the place of laminated core 13 in Figure 4. In addition, sleeve 23 serves as a flywheel, similar to sleeve 15 of Figure 4.

The inner surface of the ends of sleeve 23 are cut away at 23a to form a shoulder 23b at either end. The end plates 24 which carry bearing means 25 are pressed into cutout portions 23a and rotatably support rotor 23 on shaft 21.

As is apparent from a comparison of Figures 1 and 4, the construction of my gyroscope motor is much simpler than that of the prior art. There are no laminations, windings or the like in the rotor which are both difficult to assemble and contribute to the inherent unbalance of the device. The rotating member 23 of Figure 1 is completely symmetrical and the difficult balancing problem is quite simplified as a result. This greatly reduces the assembly time of the gyroscope motor and thus the cost thereof.

The use of a solid homogeneous member for the secondary or rotor of an induction motor is practical in this application since a gyroscope motor is not subjected to a load. The fact that such a motor might be inefficient or impractical for power use is unimportant.

Figure 3:
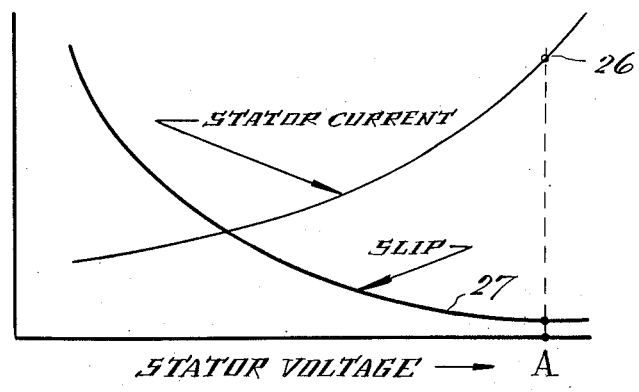
Figure 3 is a graph of the operating characteristics of the motor of Figures 1 and 2.

Figure 3 shows a plot of stator current, curve 26, and slip, curve 27, as functions of stator voltage. It is apparent from the drawings that as the stator voltage, or current, is increased the slip decreases from the relatively high value until it approaches zero as an asymptote. It is desirable that the slip be minimized in order that the rotor have as high a speed as possible.

On the other hand, the stator current tends to rise quite rapidly as the stator voltage is increased. Accordingly, it is desirable to choose an operating point such as that indicated at A where the slip is relatively low and the stator current has not become excessive. It has been found by experiment that this operating point corresponds to an air gap flux density of the order of 2,500 to 3,500 gausses. It is preferable to operate the asynchronous gyroscope motor with a flux density of approximately 3,000 gausses. The rotor sleeve 23, as pointed out before, must be both ferromagnetic and conductive and is preferably of a homogeneous (i. e., non-laminar) construction.

As indicated above, steel is a suitable material for the construction of sleeve 23. Magnetically soft iron, having almost the same properties as chemically pure iron, has also been tested and found satisfactory. Of the steels tested, those which seem to operate best are S. A. E. #1042 and S. A. E. #1045. The electrical and magnetic properties of these metals are important as they determine the suitability of the material for use in the rotor 23. The specific resistivity of the materials discussed above is of the order of $2 \times 10^{-5}$ to $5 \times 10^{-5}$ ohm-cm. The magnetic properties of the metals may best be represented by considering that they have a flux density of between 12,000 and 19,000 gausses with a magnetic field intensity of 150 oersted.

It is particularly desirable in gyroscope motors that the rotor be free from longitudinal movement on the shaft of the stator at all times. This is so since to allow such longitudinal movement would permit a shift in the relative position of the center of gravity of the gyroscope which would impair the accuracy of the unit. In order to prevent longitudinal play under adverse temperature conditions, it is desirable to place the bearings under a certain amount of axial preload.

Referring again to Figure 1, it is seen that shaft 21 is provided with a pair of shoulders 21a on either side of stator 20. The inner face 25a of bearings 25 is adapted to bear against shoulders 21a. In assembling the gyroscope motor, one of the end plates 24 is inserted into the end of sleeve 23 until flange 24a abuts against shoulder 23b. The other end plate is then inserted into the other end of sleeve 23 and pressed in a carefully calibrated distance in order to place a predetermined axial preload on bearings 25.

The amount of axial preload necessary varies according to the size of the unit and is limited by the design of the bearing means. I have found a preload of a pound or so to be quite adequate.

In order to facilitate the insertion of the end plates 24 and the accurate adjustment of the bearing preload it is desirable that they be as resilient as practicable. Accordingly, a plurality of apertures 24b are cut therein.

While I have shown and described certain embodiments of my invention, it is to be understood that it is capable of many modifications. Changes therefore, in the construction and arrangement may be made without departing from the spirit and scope of the invention as disclosed in the appended claim.

I claim:

A motor of the character described, comprising: an inner stator element having a longitudinally extending shaft with stop means on the shaft spaced outwardly on either side of the stator element; means for energizing said stator element to produce a rotating magnetic field; rotor means comprising a sleeve of homogeneous ferromagnetic material surrounding said stator; a pair of end plates, one of said end plates having apertures formed therein to increase the flexibility thereof; and a bearing carried by each of said end plates, said end plates frictionally engaging said sleeve, and said bearings rotatably supported on said shaft, with the bearings in engagement with said stop means and said flexible end plate stressed to establish a predetermined axial preload on the bearings, preventing axial movement of said rotor.

References Cited in the file of this patent

UNITED STATES PATENTS

| | | |
|---|---|---|
| 735,118 | Langdon-Davies et al. | Aug. 4, 1903 |
| 1,207,861 | Chapman | Dec. 12, 1916 |
| 1,551,347 | Trombetta | Aug. 25, 1925 |
| 1,725,740 | Schulte | Aug. 20, 1929 |
| 1,913,211 | Prince | June 6, 1933 |
| 2,041,875 | Stoller | May 26, 1936 |
| 2,311,652 | Esval | Feb. 23, 1943 |

FOREIGN PATENTS

| | | |
|---|---|---|
| 710,799 | Great Britain | June 16, 1954 |
| 866,814 | Germany | Feb. 12, 1953 |
| 269,308 | Sweden | Oct. 2, 1950 |

OTHER REFERENCES

"Induction and Synchronous Motors with Unlaminated Rotors," by W. J. Gibbs, Jour. I. E. E., Vol. 95, part II, pp. 411–420, August 1948.